(12) United States Patent
De et al.

(10) Patent No.: US 12,457,505 B2
(45) Date of Patent: Oct. 28, 2025

(54) METHOD AND AN APPARATUS FOR WIRELESS INFORMATION AND ENERGY TRANSFER USING DISTRIBUTED BEAMFORMING

(71) Applicant: INDIAN INSTITUTE OF TECHNOLOGY DELHI, New Delhi (IN)

(72) Inventors: Swades De, New Delhi (IN); Smriti Sachdev, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 383 days.

(21) Appl. No.: 18/031,040

(22) PCT Filed: Oct. 13, 2021

(86) PCT No.: PCT/IN2021/050983
§ 371 (c)(1),
(2) Date: Apr. 10, 2023

(87) PCT Pub. No.: WO2022/079736
PCT Pub. Date: Apr. 21, 2022

(65) Prior Publication Data
US 2024/0007867 A1 Jan. 4, 2024

(30) Foreign Application Priority Data
Oct. 13, 2020 (IN) .............................. 202011044535

(51) Int. Cl.
*H04B 7/06* (2006.01)
*H04W 16/28* (2009.01)

(52) U.S. Cl.
CPC .................................. *H04W 16/28* (2013.01)

(58) Field of Classification Search
CPC ........ H04B 7/043; H04B 7/005; H04B 7/066; H04B 7/0617; H04B 7/0695; H04B 7/024;
(Continued)

(56) References Cited

U.S. PATENT DOCUMENTS

2021/0211162 A1* 7/2021 Yeste Ojeda .......... H04B 7/043

FOREIGN PATENT DOCUMENTS

KR 10-2018-0124783 A 11/2018

OTHER PUBLICATIONS

International Search Report and Written Opinion issued in corresponding International Application No. PCT/IN2021/050983, dated Dec. 27, 2021, pp. 1-10.
(Continued)

*Primary Examiner* — Fred A Casca
(74) *Attorney, Agent, or Firm* — George Likourezos; Carter, DeLuca & Farrell LLP

(57) ABSTRACT

Apparatus and method of the present disclosure relates to facilitating at least one of wireless data communication and energy transfer using distributed beamforming in a wireless network. The present disclosure introduce a DBF scheme optimizes the receiver-end processing by significantly reducing the search-space for optimum phase shifts for each of the transmitters (102a . . . 102n). This contributes to significant reduction in energy expenditure at the energy-constrained receiver node. Also, a short broadcast feedback is employed to achieve high beamforming gain for several consecutive slots in the coherence time, thereby achieving high data rate information transfer and quick charging.

14 Claims, 5 Drawing Sheets

(58) Field of Classification Search
CPC .......... H04W 16/28; H02J 50/20; H01Q 3/34; H01Q 3/205; H01Q 3/267; H01Q 3/36
See application file for complete search history.

(56) References Cited

OTHER PUBLICATIONS

Zeng, T. et al., "Communications and Signals Design for Wireless Power Transmission" IEEE Transactions on Communications (Mar. 2017) pp. 2264-2290, vol. 65, Issue 5.
Mumdumbai, R. et al., "Distributed transmit beamforming: challenges and recent progress" IEEE Communications Magazine (Feb. 2009) pp. 102-110, vol. 47, Issue 2.
Choi, K. W. et al., "Distributed Wireless Power Transfer System for Internet of Things Devices" IEEE Internet of Things Journal (Jan. 2018) pp. 2657-2671, vol. 5, Issue 4, Aug. 2018.

* cited by examiner

200

300

400

500

600

700

800

METHOD AND AN APPARATUS FOR WIRELESS INFORMATION AND ENERGY TRANSFER USING DISTRIBUTED BEAMFORMING

TECHNICAL FIELD

The present disclosure relates to wireless communication. More particularly, but not exclusively, to a method and apparatus for distributed beamforming (DBF) techniques which enables efficient wireless information and wireless energy transfer in wireless networks.

BACKGROUND

Wireless sensor networks are becoming ubiquitous in the age of IoT. Low-power devices running on battery are preferred in many applications due to small form factor and their ability to be deployed in remote locations irrespective of the availability of power source. As more and more battery-powered IoT sensor nodes are deployed, there arises a need to devise an efficient charging mechanism that provides economies of scale and also caters to those sensor nodes which are remotely placed or are placed in hazardous environments. Wireless energy transfer via RF radiation is one such possibility in this direction. However, Distributed Beam Forming (DBF) increases the efficiency of wireless power transfer by using multiple collaborative nodes to concentrate energy in the direction of the receiver. It also enables more information (data) to be transferred in shorter time. In a scenario with N transmitting nodes with independent clocks, by DBF the signal-to-noise ratio (SNR) can be increased by up to $N^2$ times at the same transmit power (as opposed to N times without DBF) or it can also be used to reduce power consumption at the transmitters by a factor of $N^2$ to achieve the same data rates. Hence, distributed beamforming is a step towards charging quicker and farther. However, DBF presents its own challenges of frequency, time, and phase synchronization amongst the transmitting nodes having independent clocks and positioned at unknown locations.

With N RF transmitters, up to $N^2$ times power gain with DBF can be applied to charge battery-powered wireless energy harvesting nodes on-demand, for uninterrupted operation of the wireless sensor network. However, as the nodes are energy constrained, there is a need to minimize the energy expended in achieving coherence for beamforming so that maximum amount of energy is utilized for energy harvesting and information transfer. The existing techniques such as one-bit feedback technique require receiver feedback after each iteration; hence this approach quickly depletes the receiver's stored energy. On the other hand, techniques such as master-slave open loop synchronization and round-trip technique require several rounds of coordination among the energy-constrained transmitting nodes. Hence, methods such as zero-feedback and non-feedback have been proposed by the researchers where little or no coordination is required among the transmitters or between the transmitters and the receiver. However, the zero-feedback technique is more suitable for emergency networks as it relies of the chance synchronization of the transmitted signals at the receiver and is able to achieve a low rate of coherence. Hence, no significant energy gains can be achieved with zero-feedback approach. The non-feedback method focuses on receiver-end processing only without any coordination between the transmitters. Further, this technique is also not suitable for energy transfer, because during N slots of transmission the signals arrive incoherently. After N slots, the phase correction is done and then beamforming gain is only achieved in the (N+1)th slot, and hence effectively energy harvesting takes place in only 1 out of (N+1) slots. Moreover, the method is unstable under fading channel conditions and is energy intensive at the receiver because the amount of processing increases exponentially with the number of transmitters.

Therefore, there exists a need to overcome the above mentioned problems and at the same time achieve effective energy management under channel fading conditions and also provides efficient utilization of each transmission slot for data and energy transfer.

The information disclosed in this background of the invention section is only for enhancement of understanding of the general background of the invention and should not be taken as an acknowledgement or any form of suggestion that this information forms the prior art already known to a person skilled in the art.

OBJECTIVES

An object of the present disclosure is to provide receiver-end DBF which achieves sustained beamforming gain with limited control data transmission and broadcast feedback.

Another objective of the present disclosure is to provide a base DBF scheme for wireless information and energy transfer to effectively manage channel fading from the different transmitters to the beamforming receiver.

Yet another objective of the present disclosure is to provide search-space reduction in phase alignment so that the receiver-end processing is significantly reduced, thereby facilitating wireless data communication and/or energy transfer effectively and energy saving in DBF.

Another objective of the present disclosure is to provide sustained beamformed reception over extended periods without requiring any receiver-end processing.

Yet another objective of the present disclosure is to reduce the FLOPS executed at the receiver; for 10 transmitter nodes the number of FLOPS is reduced by approximately 14% and approximately 90% search-space reduction is achieved without appreciable degradation of beamforming gain.

Another objective of the present disclosure is to increase the total beamforming gain over the channel coherence time.

Yet another objective of the present disclosure is to optimize the control data transmission and feedback requirements and dynamic initialization of feedback based on fading channel conditions.

SUMMARY

Before the present system and method is described, it is to be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

In one non-limiting embodiment of the present disclosure, a method for facilitating at least one of wireless data communication and energy transfer using distributed beamforming in a wireless network is disclosed. The method comprising: implementing a plurality of transmitter nodes communicatively coupled with a user device in the wireless network; receiving, by a receiver of the user device, a plurality of transmission signals corresponding to the plurality of transmitter nodes being in an orthogonal multiple access communication; selecting, by a processor of the user device, one of the transmission signal, amongst the plurality of transmission signals, as a reference transmission signal for computing a phase-shift for the remaining transmission signals of the plurality of transmission signals, wherein the phase shift and signal strength for each of the remaining transmission signals is determined by: applying one or more predetermined phase-shift values upon each of the remaining transmission signals; determining a beamforming gain for each of the remaining transmission signals with respect to the reference signal based on the applied one or more predetermined phase shift values, wherein the beamforming gain indicates the signal strength of each of the corresponding signal after being beamformed at one or more time instances corresponding to the one or more predetermined phase-shift values when applied; selecting at least one predetermined phase-shift value corresponding to each transmitter node, amongst the one or more predetermined phase-shift values, having a maximum beamforming gain, thereby indicating the optimum phase shift for that transmitter; and facilitating, by the processor of the user device, at least one of the wireless data communication and energy transfer from the plurality of transmitter nodes with the receiver of the user device by enabling each of the plurality of transmitter nodes to transmit data or energy simultaneously, at the predetermined phase-shift computed by the receiver and fed back to the transmitter, thereby achieving the beamforming gain.

According to an aspect of the present disclosure, as disclosed, the maximum beamforming gain is $N^2$, where N is the number of transmitters nodes.

According to an aspect of the present disclosure, as disclosed, selecting the predetermined phase shift values is based on the channel phase distribution, wherein the phase distribution is Nakagami-m phase distribution According to another aspect of the present disclosure, as disclosed, selecting the predetermined phase shift value from a group of finite values, the group comprising $\pi/4$, $3\pi/4$, and $5\pi/4$ and $7\pi/4$.

According to yet another aspect of the present disclosure, as disclosed, selecting the signal received from the first transmitter node as reference signal if orthogonal multiple access is time division multiple access (TDMA).

According to still another aspect of the present disclosure, as disclosed, sending a feedback dynamically to the plurality of transmitter nodes and selecting, one of the transmission signals amongst the plurality of transmission signals, as a reference transmission signal again if the beamforming gain is below a minimum threshold point According to another aspect of the present disclosure, as disclosed, the minimum threshold point is the point where the beamforming gain is less than N.

In another embodiment of the present disclosure an apparatus for facilitating at least one of wireless data communication and energy transfer using distributed beamforming is disclosed. The apparatus comprises a plurality of transmitter nodes communicatively coupled with a user device in a wireless network; a receiver configured to receive a plurality of transmission signals corresponding to the plurality of transmitter nodes being in an orthogonal multiple access communication; a processor is configured to: select one of the transmission signal amongst the plurality of transmission signals, as a reference transmission signal for computing a phase-shift for the remaining transmission signals of the plurality of transmission signals, wherein for determining the phase shift and signal strength for each of the remaining transmission signals, the processor is configured to: apply one or more predetermined phase-shift values upon each of the remaining transmission signals; determine a beamforming gain for each of the remaining transmission signals with respect to the reference signal based on the applied predetermined phase shift values, wherein the beamforming gain indicates the signal strength of each of the corresponding beamformed signal at one or more time instances corresponding to the one or more predetermined phase-shift values when applied; select at least one predetermined phase-shift value corresponding to each transmitter node, amongst the one or more predetermined phase-shift values, having a maximum beamforming gain, thereby indicating the optimum phase shift for that transmitter; and facilitate the at least one of the wireless data communication and energy transfer from the plurality of transmitter nodes with the receiver of the user device by enabling each of the plurality of transmitter nodes to transmit data or energy simultaneously, at the predetermined phase-shift computed by the receiver and fed back to the transmitter, thereby achieving the beamforming gain.

According to another aspect of the present disclosure, as disclosed, the maximum beamforming gain is $N^2$, where N is the number of transmitters nodes.

According to yet another aspect of the present disclosure, as disclosed, the processor is configured to select the predetermined phase shift values based on the channel phase distribution, wherein the phase distribution is Nakagami-m phase distribution.

According to still another aspect of the present disclosure, as disclosed, the processor is configured to select the predetermined phase shift value from a group of finite values, the group comprising $\pi/4$, $3\pi/4$, $5\pi/4$ and $7\pi/4$.

According to another aspect of the present disclosure, as disclosed, the processor is further configured to select the signal received from the first transmitter node as reference signal if orthogonal multiple access is time division multiple access (TDMA).

According to another aspect of the present disclosure, as disclosed, the processor is further configured to dynamically send a feedback to the plurality of transmitter nodes and select one of the transmission signals amongst the plurality of transmission signals, as a reference transmission signal again if the beamforming gain is below a minimum threshold point.

According to another aspect of the present disclosure, as disclosed, the minimum threshold point is the point where the beamforming gain is less than N.

In the above paragraphs, the most important features of the invention have been outlined, in order that the detailed description thereof that follows may be better understood and in order that the present contribution to the art may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore that the claims be regarded as including such equivalent constructions as do not depart from the spirit and scope of the invention.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of apparatus and/or methods in accordance with embodiments of the present subject matter are now described, by way of example only, and with reference to the accompanying figures, in which:

Figure 1:
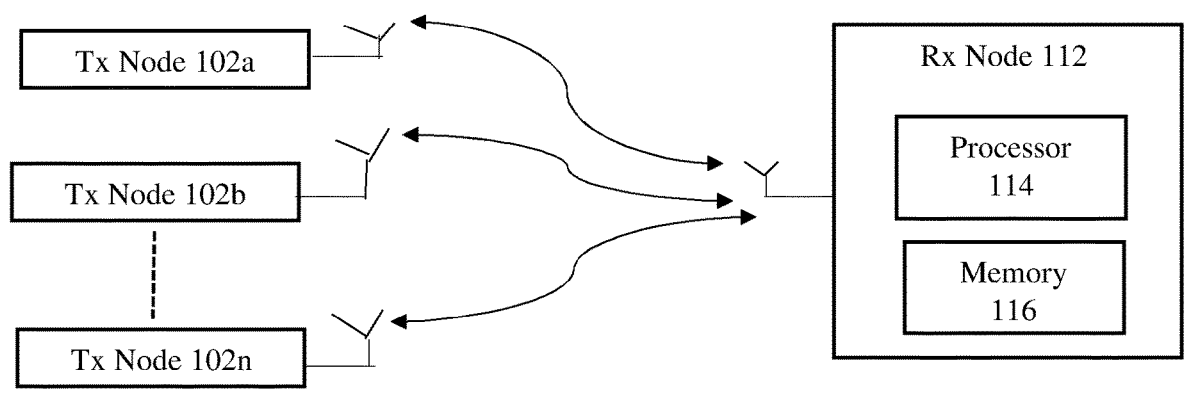
FIG. 1 represents a detailed diagram illustrating the distributed beamforming network.

It should be appreciated by those skilled in the art that any block diagrams herein represent conceptual views of illustrative systems embodying the principles of the present subject matter. Similarly, it will be appreciated that any flow charts, flow diagrams, and the like represent various processes which may be substantially represented in computer readable medium and executed by a computer or processor, whether or not such computer or processor is explicitly shown.

DETAILED DESCRIPTION OF DRAWINGS

The present invention will be described herein below with reference to the accompanying drawings. In the following description, well known functions or constructions are not described in detail since they would obscure the description with unnecessary detail.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, apparatus, system or method that comprises a list of components or steps does not include only those components or steps but may include other components or steps not expressly listed or inherent to such setup or device or apparatus or system or method. In other words, one or more elements in a system or apparatus or device proceeded by "comprises . . . a" does not, without more constraints, preclude the existence of other elements or additional elements in the system or method.

The term "transmitter or transmitting nodes or source" and "beamforming node, or receiving node or receiver" and "user device or mobile device or IoT device", and "medium/channel" may be used interchangeably or in combination throughout the description.

The present disclosure relates to a method and an apparatus for facilitating wireless data communication and/or energy transfer using distributed beamforming in a wireless network. In an embodiment, the present invention facilitates wireless data communication using distributed beam forming. In one embodiment, the invention facilitates wireless data communication using distributed beam forming. In another embodiment, the present invention facilitates energy transfer using distributed beam forming technique. In yet another embodiment, the present invention facilitates energy transfer as well as wireless data communication using distributed beamforming technique. Particularly, the present disclosure introduce a distributed beamforming (DBF) technique for wireless information and energy transfer which optimize receiver-end processing by reducing the interaction between the energy-constrained receiver to the transmitter nodes or among the other transmitter nodes. The receiver in the present disclosure optimizes the processing by significantly reducing the search-space for finding optimum phase shifts for each of the transmitter nodes. This also contributes to significant reduction in energy expenditure at the energy-constrained receiver node. Also, a short broadcast feedback is shared to the transmitter nodes, thereby achieving high data rate information transfer and quick charging. The feedback gain is more prominent in a communication scenario with strong line of sight or slow fading channel environments. Compared to the conventional techniques, the present technique performs well even in fast fading environments. The present disclosed technique is impactful in wireless RF energy transfer and broadband wireless access over low-cost fixed wireless systems.

The present disclosure is able to achieve sustained beamforming gain with limited control data transmission and broadcast feedback by employing DBF in energy-efficient manner. In DBF, plurality of transmitter nodes are communicatively coupled with the receiver node and receiver is configured to receive plurality of transmitted signals from the corresponding transmitting nodes in an orthogonal multiple access communication.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The proposed technique for distributed beamforming is elaborated as under:

FIG. 1 depicts the system (100) which illustrates the distributed beamforming network in accordance with an embodiment of the present disclosure. FIG. 1 depicts a wireless communication system which comprises a receiver node (112) and multiple transmitting nodes (102a ... 102n). The multiple transmitting nodes can transmit and receive signals with the help of antenna(s) installed on them. The receiving node (112) further comprises a processor (114) and a memory (116) and other components (not shown in figures). In another embodiment, the receiving node (112) may also be treated as user device which is capable of transmitting the signals towards the transmitting nodes (102a ... 102n) and is able to receive the signals form the transmitting nodes. However, the signals can be transmitted and received using a wireless medium.

The distributed beamforming (DBF) involves collaboration between the signals transmitted from multiple transmitting nodes (102a ... 102n) whose locations are often unknown. When frequency, timing, and phase-synchronization are present between nodes, signals from the N transmitter nodes (102a ... 102n) add coherently at the location of the receiver (112) to achieve a power gain or beamforming gain up to $N^2$ as compared to incoherent addition that offers power gain up to N.

To achieve phase synchronization, each transmitter node (102a ... 102n) has to be phase shifted suitably to compensate the different initial phases of the transmitters' clocks, phase difference due to different locations of the transmitting nodes (102a ... 102n) and also the channel phase variations. Therefore, in the present invention, the receiver node (112) is used to calculate the beamforming weights as the signal at the receiver contains the accumulation of all these phase shifts. Assuming frequency and timing synchronization, the beamforming technique used for achieving phase synchronization at the receiver (112) is as follows: The plurality of transmitter nodes (102a ... 102n) transmit signals in an orthogonal multiple access communication. The initial communication from the plurality of transmitter nodes (102a ... 102n) to the receiver node (112) requires to be via orthogonal multiple access, which can be TDMA, FDMA, CDMA, etc.

In an exemplary embodiment, the transmitter nodes (102a ... 102n) transmit the signals to the receiver node (112) in Time Division Multiple Access (TDMA) manner. In TDMA technique, transmission takes place for N slots, where N is the number of transmitter nodes. Each transmitter (102a ... 102n) is assigned one exclusive transmission slot as per the N×N transmission matrix shown below:

$$T_{N \times N} = \begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & \ddots & 0 \\ 0 & 0 & 0 & \cdots & 1 \end{bmatrix}.$$

First transmitter (102a) transmits signal in first slot, second transmitter (102b) transmits signal in second slot, and so on to the receiver node (112). The receiver node (112) receives each of the signals in the N slots individually and calculates the optimum phase shift for each of the transmitter. In TDMA, the receiver (112) selects the first received signal as reference signal and processes the rest of signals pairwise with the reference signal in '2-node beamforming' fashion in the order in which other signals are received. This 2-node beamforming technique is known as basic distributed beamforming. In another embodiments, such as FDMA and CDMA or any other orthogonal transmission, any of the received signal may be considered as the reference signal as the signals may be received simultaneously at the receiver (112) in these techniques. Accordingly, the other signals are processed in 2-node beamforming fashion in the order in which these signals are received at the receiver node (112). Then, the Nakagami-m phase distribution is used for reducing the search space for phase synchronization. Particularly, instead of searching for all the possible values between 0 to 360 degrees. The Nakagami-m phase distribution helps in selecting the predetermined phase shift values based on the channel phase distribution. The values for phase shift are selected from a group of finite predetermined phase shift values, the group comprising at least one of π/4, 3π/4, 5π/4 and 7π/4. Particularly, the value for phase correction can be selected from finite predetermined phase shift values such as π/4, 3π/4, 5π/4 and 7π/4.

The other signal apart from the reference signal is phase shifted by each of the predetermined values π/4, 3π/4, 5π/4 and 7π/4 and then added to the reference signal to determine which phase shift results in maximum combined signal strength. The phase shift which provides maximum signal strength at the receiver is selected as the optimum phase for the corresponding transmitter. For example, at first instance, the signal transmitted from transmitter1 is considered as reference signal. Then signal received from second transmitter is shifted by first π/4 degree and is added with the reference signal to determine combined signal strength. Likewise, at second instance, signal received from second transmitter is shifted by 3π/4 and combined with reference signal to determine combined signal strength. Similarly, the signal transmitted from second transmitter is phase shifted by 5π/4 at next instance and then combined with reference signal to determine combined signal strength and in the last, the signal transmitted from the second transmitter is phase shifted by the fourth value in the predetermined phase shift 7π/4 and added to the reference signal to determine combined signal strength of the signals. The receiver after receiving all the combined signal strength with respect to each phase shift value may determine the phase shift value at which the maximum signal strength is obtained. That phase shift value at which maximum signal strength is achieved or determined is considered as the optimum phase shift value for second transmitter. In the similar way, optimum phase shift value is determined for each of the transmitted signal received from a plurality of transmitter nodes. Further, the predetermined phase shift values are selected irrespective of the value of m in a Nakagami-m channel for a typical fading environment (i.e suffering from attenuation due to multipath propagation, weather or obstacles etc.), thus, in this way, the phase search space is significantly reduced and hence computation/energy overhead at the receiver node is also reduced.

After determination of optimum phase shift for each transmitter, the receiver provides a feedback to the transmitter(s) about its correct phase shift where maximum signal strength is obtained. In an embodiment, the receiver (112) sends the feedback to the corresponding transmitter as soon as final phase correction is determined for the corresponding transmitter. In another embodiment, the receiver broadcasts phase correction for corresponding transmitter once optimal phase shifts for all the transmitters present in the system are determined. Accordingly, the corresponding transmitter(s) re-initialize transmission of signals based on the feedback received from the receiver (112). All the transmitters after applying the corresponding optimum phase shift transmit the signal simultaneously and at the receiver these signals are added together to get the beamformed signal. In the conventional art, this beamforming gain was calculated after completion of N slots (i.e. corresponding to each transmitter. However, the present invention provides an advantage of achieving beam forming gain at each transmission slot. Further, the receiver (112) calculates the beamforming gain based on the signals received from the plurality of transmitters and compares the same with the expected beamforming gain. If the beamforming gain decreases below a minimum threshold then the receiver (112) send a feedback again to the corresponding transmitter(s) for phase correction. In an embodiment, the beamforming gain expected at the receiver is $N^2$ after phase correction, however, if the beamforming gain reduces to minimum threshold gain (i.e. N), the receiver again broadcasts the feedback about phase correction to corresponding transmitters.

Figure 2:
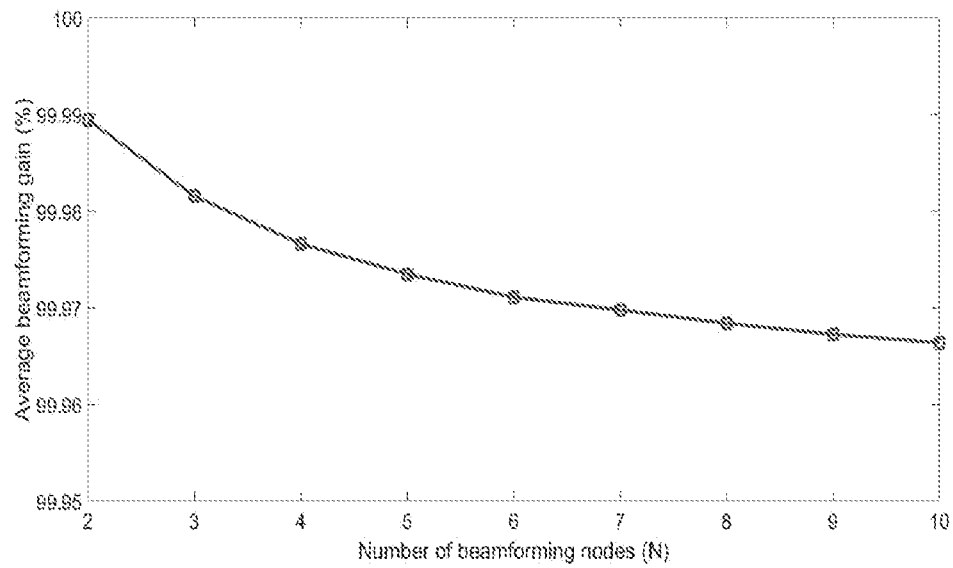
FIG. 2 represents a detailed diagram illustrating the average beamforming gain in percentage for varying number of transmitter nodes (N) for the Distributed Beam Forming (DBF) without search-space reduction or feedback.

FIG. 2 represents a detailed diagram illustrating the average beamforming gain in percentage for varying number of transmitter nodes (N) for the basic DBF (i.e. without search-space reduction or feedback).

In a basic distributed beam forming technique, the receiver selects one of the received signals as a reference signal and processes the rest of signals pairwise with the reference signal in '2-node beamforming' fashion. The other signals in the pair with reference signal are phase shifted by all possible angles from 0 to 360 degrees and added to the reference signal to check which phase results in maximum combined signal strength. The phase shift angle which provides maximum combined signal strength is selected as the optimum phase for the signal. All the signals are then added together after applying the corresponding optimum phase shifts at the receiver itself to get the beamformed signal. In this type of basic distributed beamforming, the receiver has to perform all the tasks of phase shifting on behalf of all the transmitters available in the system. Further, all the angles between 0 to 360 degrees are checked for finding the optimum phase shift value of each transmitter. The response of beam forming gain achieved using basic distributed beam forming technique (which is extended for 10 transmitters) is presented in FIG. 2. It can be observed that average beamforming gain achieved in a basic distributed beam forming technique with 2 nodes i.e. 2 transmitters is about 99.99% which get reduced to 99.97 even when the number of transmitters increased to 10. Thus, by using the basic distributed beam forming, average beamforming gain is reduced only by a fraction rather than by a significant value. However, the basic distributed beamforming technique is complex and time consuming as every angle between 0 to 360 degrees is searched out to get the optimum phase value. Further, as the number of transmitter increases the time and complexity may also get increased.

Phase offset due to channel fading is also a major factor which desynchronizes the transmitted signals as the channel phase remains nearly constant only up to the coherence time (i.e. the time duration over which the channel impulse response is considered to be not varying) of the channel. These channel phase variations occur as per the distribution of the channel phase. Conventionally, channel is assumed to have uniform distribution which is true when channel envelope is Rayleigh. However, in practice, fading scenarios other than Rayleigh are also encountered, especially when transmitter-receiver distance is small (as in RF energy transfer scenario) or where there exists a strong line-of-sight signal strength (as in fixed wireless backhaul communication link). The present disclosure employs Nakagami m-phase distribution, as it covers varying ranges of channel fading as the m-parameter varies from half (i.e. one-sided Gaussian) to one (i.e. Rayleigh distribution) to infinity (i.e. Rician distribution). In the conventional techniques, the phase distribution is non-uniform for all cases except m=1 (Rayleigh) and has strong peaks for moderate to high values of m. It is determined in the present invention that using Nakagami m-phase distribution, four peak points can be determined where strong line of sight can be achieved. For example, instead of searching the entire space of 0 to 2π(i.e. 360), in typical fading conditions the four predetermined points π/4, 3π/4, 5π/4 and 7π/4 representing the possible differences between the peak locations (presented in FIG. 3) are used for phase correction. Accordingly, the present technique of phase synchronization exploits the non-uniform nature of the channel phase distribution to significantly reduce the search space.

Figure 3:
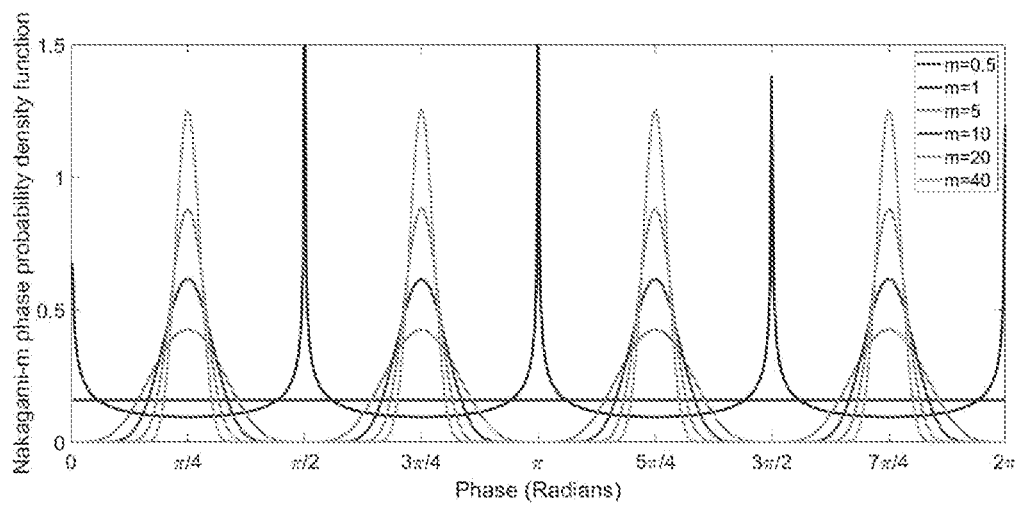
FIG. 3 represents a plot of Nakagami-m phase probability density function of 'm' in a typical fading channel.

FIG. 3 represents a plot of Nakagami-m phase probability density function of 'm' in a typical fading channel. As it can be observed from FIG. 3, which is based on the phase distribution, the location of the peaks changes when m<1 to when m>1. When m<1, impulse like peaks are observed at π/2, π and 3π/2, whereas with m>1, the peaks are at π/4, 3π/4, 5π/4 and 7π/4. The present technique of search-space reduction makes use of the fact that with high probability, the channel phase is likely to be one of the peak locations, Hence, the entire search-space from 0 to 360 degree need not be searched. It is presented that significant beamforming gains can still be achieved using the reduced search-space. In this way, by reducing the search space to only finite points, present invention provides modification over the basic distributed beamforming. Further, as instead of searching the complete search space i.e. from 0° to 360°, only a limited search is conducted, this leads to reduction in time for processing the signals and reduces the complexity.

Further advantage of the technique is that the exact value of channel phase is not required. The phase extraction would be difficult if the signal at the receiver (112) contains the cumulative phase shift from all the sources of phase error. In some embodiments, the receiver receives the phase shifted value of signal transmitted from the transmitter due to channel conditions or initial offset provided for that transmitter. Since peak locations occur with high probability, the optimum phase shift in the next iteration will be the previous optimum phase shift plus the difference in channel phase in current iteration and previous iteration. Since four peaks are observed for all values of m, the difference in channel phase between the two consecutive iterations turns out to be a small set of values modulo 2π. Therefore, significant saving in phase processing and the corresponding energy consumption reduction can be achieved by focusing on the phase shifts which occur with high probability.

Figure 4:
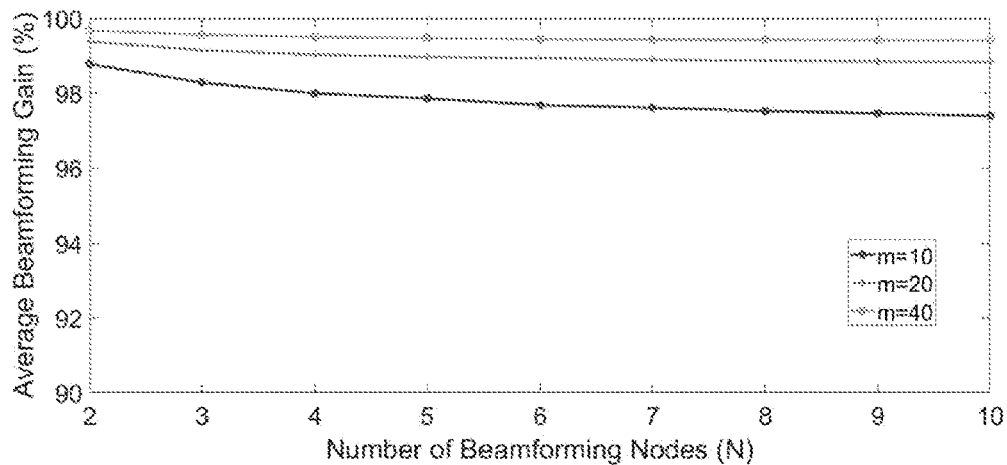
FIG. 4 represents a plot illustrating variation in average beamforming gain percentage with number of transmitter nodes (N) using search-space reduction.

FIG. 4 presents the beamforming gains that are achieved with reduced search-space for different number of beamforming nodes (N). It is also observed that, for different values of m like 10, 20, 40 etc, the present technique works reasonably well and gives good beamforming gain which is almost same as achieved in basic beam forming technique. This confirms that whether the entire search space is searched for the determining the phase shift corresponding to each transmitter or the limited search space (finite points such as π/4, 3π/4, 5π/4 and 7π/4) as suggested by the present invention, the beamforming gain is almost same. Hence, the present technique not only reduced the number of iterations but also provide effectively same gain in different channel fading scenarios. Even in strong fading scenarios when m<1, the present technique achieves close to perfect beamforming gain due to impulse like peaks in the phase distribution. Since the disclosed technique is based on the presence of peaks in the phase distribution, the worst performance of the technique is observed at m=1 as this corresponds to uniform phase distribution which has no peaks. However, it is to be noted that when line of sight is reasonably strong the gain reduction is negligible. Also, the graph confirms that even if the number of transmitter nodes increase, the value of average beamforming gain remains almost constant as present in the basic distributed beamforming technique.

Figure 5:
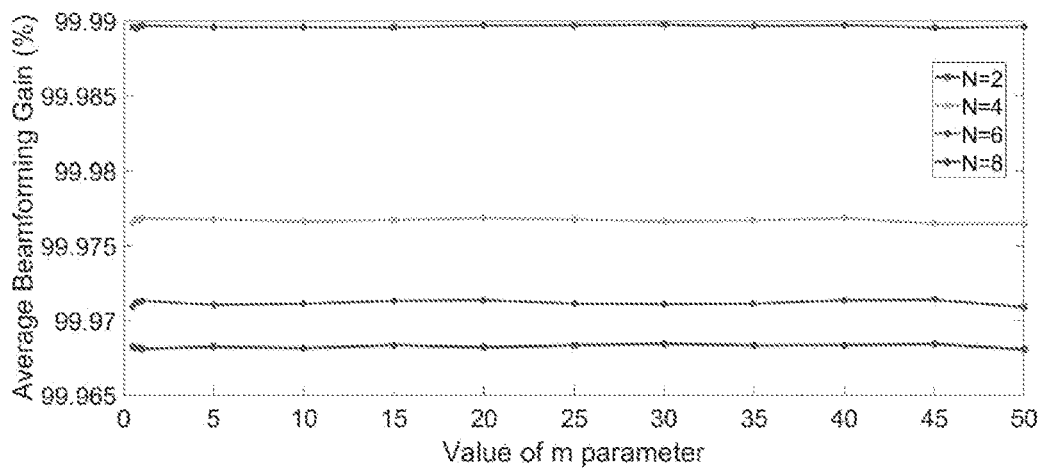
FIG. 5 represents a plot of average beamforming gain percentage with search-space reduction for different m values.

FIG. 5 shows the average beamforming gain percentage for different values of m (for a typical fading channel) using reduced search-space technique of present disclosure. FIG. 5 represent a plot of average beamforming gain percentage with search-space reduction for different values of m. For less number of transmitters, even in strong fading channel conditions, the average beamforming gain remains almost 100%. As shown in FIG. 5, for 2 transmitter nodes, the average beamforming gain is 99.99% for different values of m starting from 0 to 50. Further, as the number of transmitter node increases, the gain still decreases negligibly and remains constant. In a typical fading channel environment, even if the number of transmitter node increases still the channel fading does not impact significantly and the gain remains almost constant.

As the number of beamforming nodes (102a . . . 102n) increases, processing at the receiver (112) becomes more and more intensive due to increase in the number of 2-node beamforming operations. This translates into excessive energy consumption as well. In fact, in receiver-based beamforming scheme, as disclosed in conventional art, the number of Floating-Point Operations Per Second (FLOPS) required increases exponentially with N.

Figure 6:
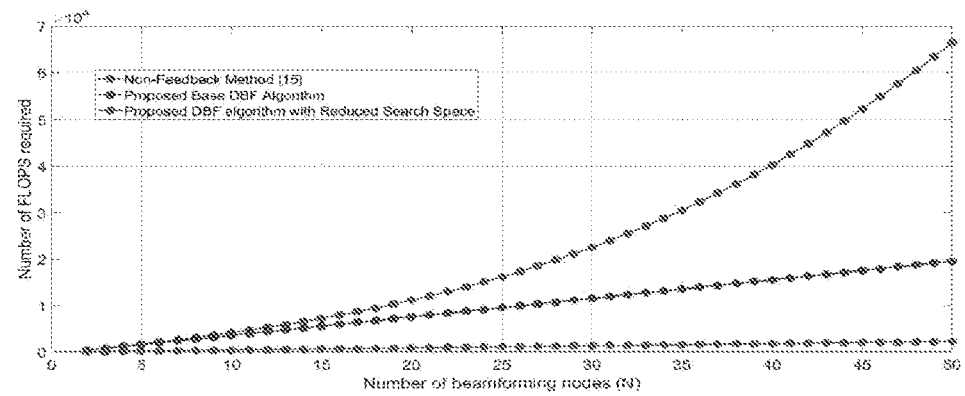
FIG. 6 represents a plot of number of FLOPS versus N for different search methods.

FIG. 6 represents a plot of number of FLOPS versus number of transmitters (N) for different search methods. In particular, FIG. 6 shows a comparison between the number of FLOPS required in the approach provided in the prior art with step of 101, and that in the proposed technique in the present disclosure with whole search space (i.e. basic distributed beam forming) and also with technique of reduced search-space with distributed beam forming. It can be observed that for reduced search-space, the number of FLOPs is linear in N, making the technique much more energy efficient as compared to other two techniques.

It is observed that the number of FLOPS executed at the receiver (112) are reduced by approximately 5.5% with proposed transmission scheme of base DBF technique (whole search space) and approximately 88.8% using search-space reduction scheme for N=4. For N=10, number of FLOPS are reduced by approximately 14% with base DBF technique and approximately 90% using search-space reduction scheme. As can be seen from the above plot, reduction in the number of FLOPS increases with N.

The discussed DBF technique has been able to achieve beamforming gain at the receiver (112). Also, search-space reduction has been employed to reduce processing at receiver (112) and conserve receiver's (112) energy as much as possible. For further gain with beamforming, feedback scheme is introduced to increase the rate of information as well as energy transfer.

The N slots of transmission in the technique discussed so far are termed as the control data transmission stage, where each transmitter (102a . . . 102n) is transmitting its signal in one of the assigned N slots. At the (N+1)th slot which can be termed as the beamforming stage, the receiver (112) having received all the transmitted signals calculates the beamforming weights and adds the received signals coherently to achieve beamforming gain. Hence, information transfer and energy transfer take place in every (N+1)th slot. The rest of the N slots are devoted to control data transmission in each iteration. The following feedback scheme is introduced which reduces the frequency of the control data transmission operation and expands the duration of the beamforming stage:

Initially, the technique is as described for N slots and at the (N+1)th slot, the receiver (112) achieves beamforming gain by applying the calculated optimum beamforming weights at the receiver (112) itself. As per this proposed scheme, the receiver (112) also feeds back the calculated optimum phase shifts to the transmitters (102a . . . 102n) in one broadcast transmission. From the next slot, all transmitters (102a . . . 102n) transmit simultaneously after having applied their corresponding phase shifts to achieve beamforming at the receiver (112). The processing at receiver (112) is avoided, and high-data rate information transfer and energy transfer can be achieved due to the high SNR in every slot.

This beamforming stage, however, cannot be continued indefinitely due to the phase variations in the channel. As channel condition changes, the previously calculated optimum phase shifts become inaccurate and the beamforming gain at the receiver (112) falls; this happens after the duration of coherence time of channel (T a). When beamforming gain falls significantly, control data transmission stage again becomes necessary to realign the beamforming weights with the current channel conditions. Particularly, when the receiver determines that the beamforming gain is reduced below a threshold point then it initiate the Control data transmission again. In other words, when beamforming gain falls below a minimum threshold point i.e below N, then for the next N slots, the transmitters (102a . . . 102n) transmit separately in their own slots to enable receiver (112) to recalculate the optimum beamforming weights for each of them and feed them back to the transmitters (102a . . . 102n) to complete the control data transmission stage. Subsequently, the transmitters (102a . . . 102n) transmit simultaneously again for several slots as per the beamforming stage. This control data transmission and beamforming cycle repeats. Hence, this technique dynamically decides the beamforming interval based on the channel conditions in order to maximize the duration of the beamforming interval.

Figure 7:
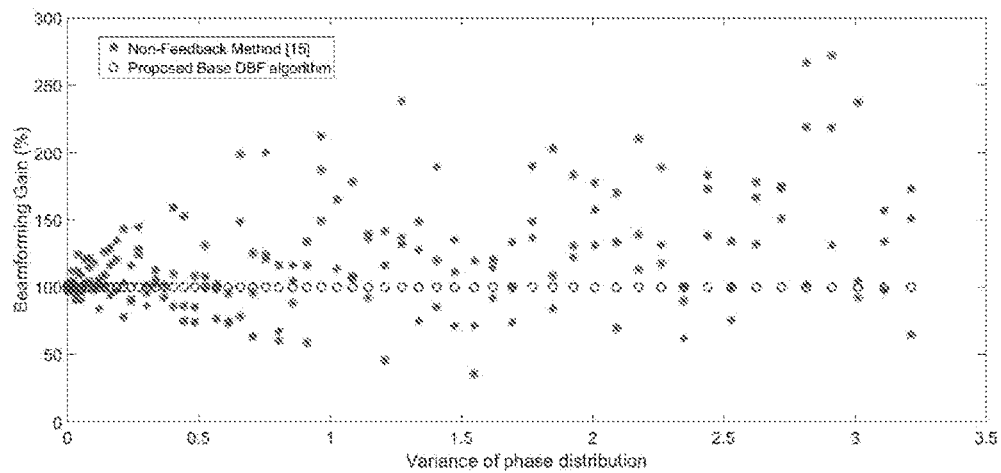
FIG. 7 represents a detailed diagram illustrating the beamforming gain percentage comparison between the non-feedback technique of conventional art and the basic DBF technique without search-space reduction or feedback for different severity of Channel fading for 4 transmitter nodes.

FIG. 7 represents the performance comparison between Non-feedback technique in the conventional art and present basic DBF transmission technique under different degrees of fading. In FIG. 7, the beamforming gain comparison for different severity of fading for 4 transmitters is represented. As it can be observed from the figure that there are strong variations present in the beamforming gain when there is no-feedback provided to the transmitter for phase correction over the distributed beam forming technique of the present invention.

Figure 8:
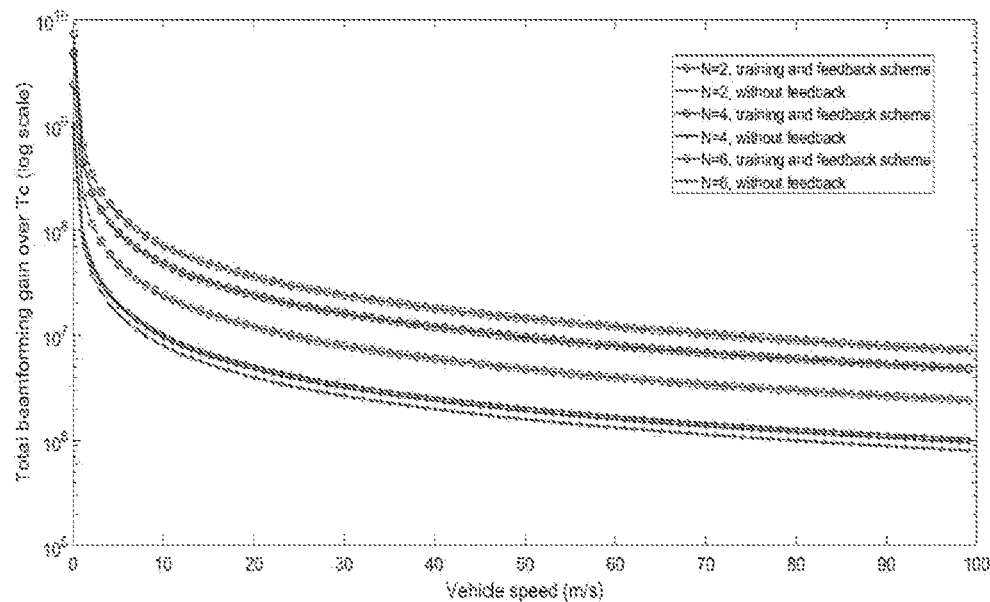
FIG. 8 represents a plot of total beamforming gain over coherence time of channel versus vehicle speed.

FIG. 8 represents a plot of total beamforming gain over coherence time of channel versus vehicle speed. In particular, FIG. 8 shows performance comparison between the present technique without feedback and present technique with the feedback scheme. It represents that if the channel is not frequently changing, the overall beamforming gain is exponentially high. However, in the present feedback scheme, beamforming stage lasts up to coherence time($T_C$) and the total gains are calculated by accumulating the gains per slot (one carrier cycle per slot) during this period. On the other hand, without feedback, beamforming occurs in every (N+1)th slot, total gains in $T_C$ for this scheme are calculated accordingly. The relation between $T_C$ (expected duration)

and vehicle speed v has been derived from the decorrelation distance of Nakagami-m phase distribution based on the first zero of the autocorrelation function. It is observed that, using the feedback scheme for N=4, m=0.5 the total beamforming gain with respect to no feedback scheme is approximately 400%, at any mobility environment speed. Thus, the feedback scheme can offer significant gain even under high mobility.

Figure 9:
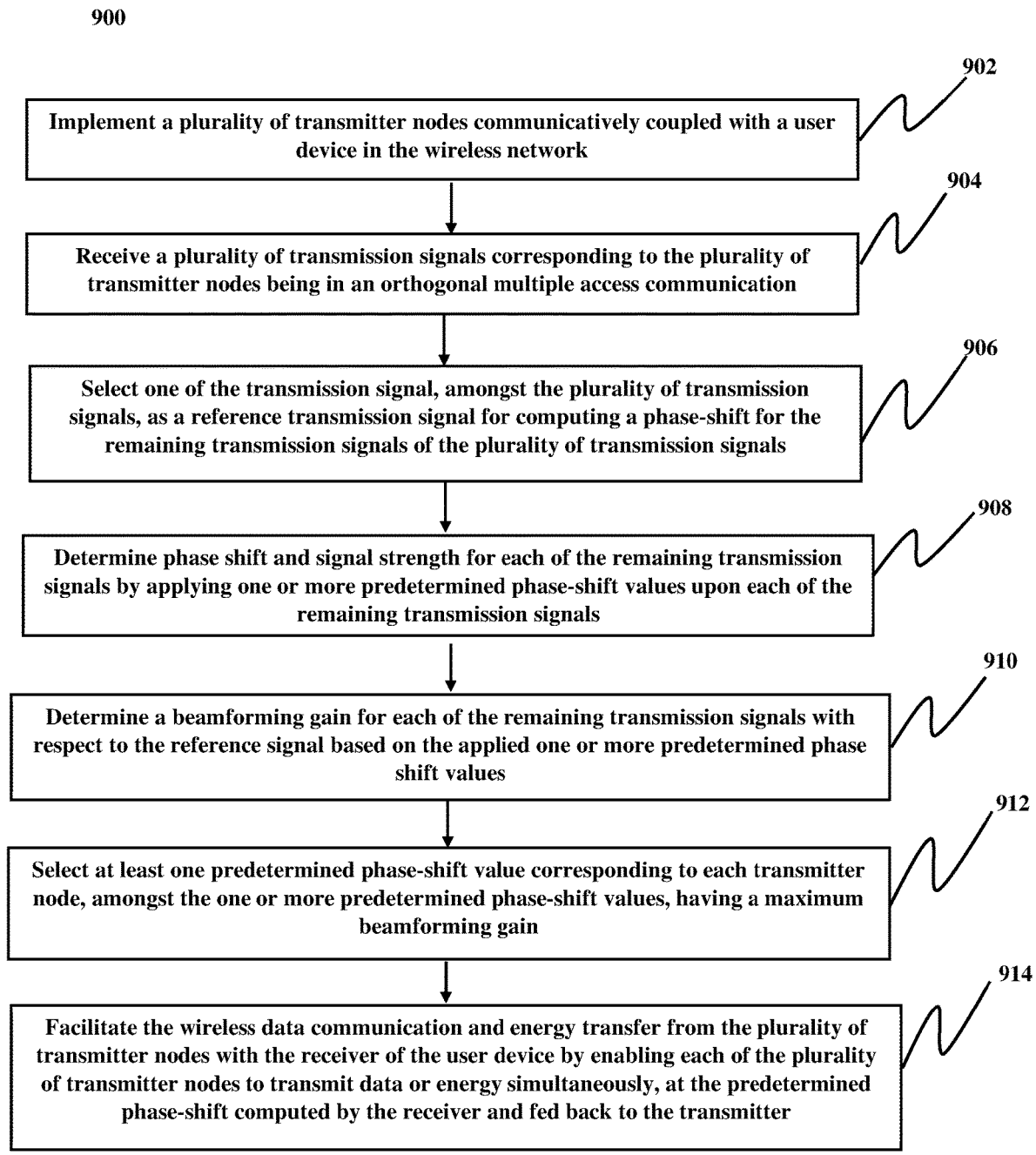
FIG. 9 represents a flowchart of method steps performed for facilitating at least one of the wireless data communication and energy transfer using distributed beamforming in a wireless network.

FIG. 9 show an example of steps performed for facilitating the at least one of the wireless data communication and energy transfer using distributed beamforming in a wireless network in accordance with embodiments of the present disclosure. In one of the embodiments, the steps performed in the method are used for facilitating the wireless data communication using distributed beam forming. In another embodiment, the steps performed in the method 900 are used for facilitating the energy transfer using distributed beamforming. Further, in another embodiment, the method steps are used for facilitating both the wireless data communication and energy transfer using distributed beam forming. The method may be described in the general context of computer executable instructions or performed by various hardware units either alone or in combination. Generally, computer executable instructions can include routines, programs, objects, components, data structures, procedures, modules, and functions, which perform specific functions or implement specific abstract data types. The order in which the method is described is not intended to be construed as a limitation, and any number of the described method steps can be combined in any order to implement the disclosed method. Additionally, individual steps may be deleted or performed separately from the methods without departing from the scope of the subject matter described herein. Furthermore, the method can be implemented in any suitable hardware, software, firmware, or combination thereof.

At block 902, the plurality of transmitter nodes (102a ... 102n) are communicatively coupled with the user device (112) in the wireless network.

At block 904, a receiver of the user device (112) receives a plurality of transmission signals corresponding to the plurality of transmission nodes (102a ... 102n) being in an orthogonal multiple access communication. The orthogonal multiple access communication may be considered as TDMA, CDMA, FDMA or any other access communication technique.

At block 906, a processor (114) of the user device (112) selects one of the transmission signal amongst the plurality of transmission signals, as a reference transmission signal for computing a phase-shift for the remaining transmission signals of the plurality of transmission signals. In an embodiment, the signal received from the second transmitter is considered as a reference signal. Based on the reference signal, the phase correction factor for the remaining received signals are computed or determined.

At block 908, the phase shift and signal strength for each of the remaining transmission signal is determined by applying one or more predetermined phase-shift values upon each of the reaming transmission signals. The phase correction factor or phase shift is calculated based on the four predetermined points 0, $\pi/4$, $3\pi/4$, $5\pi/4$ and $7\pi/4$ (as stated in above paragraphs) with respect to the reference signal.

At block 910, beamforming gain is determined for each of the remaining transmission signals with respect to the reference signal based on the applied one or more predetermined phase shift values. The beamforming gain indicates the signal strength of each of the corresponding signal after being beamformed at one or more time instances corresponding to the one or more predetermined phase-shift values when applied.

At block 912, at least one predetermined phase-shift value is selected corresponding to each transmitter node (102a ... 120n), amongst the one or more predetermined phase-shift values, having a maximum beamforming gain, thereby indicating the optimum phase shift for that transmitter. Particularly, 2-node beamforming operation is performed where the signal received from other transmitter (different from the reference signal transmitter) is phase shifted by predetermined phase shift values at different instances and added to the reference signal to determine which phase shift results in maximum combined signal strength. The phase shift value at which maximum signal strength or gain is calculated is selected as the optimum phase for the corresponding signal.

At block 914, the processor (114) of the user device (112) facilitates at least one of the wireless data communication and energy transfer from the plurality of transmitter nodes (102a ... 102n) with the receiver of the user device (112) by enabling each of the plurality of transmitter nodes (102a ... 102n) to transmit data or energy simultaneously, at the predetermined phase-shift computed by the receiver (112) and fed back to the transmitter (102), thereby achieving the beamforming gain.

In an embodiment, the optimal phase shift is calculated at the receiver corresponding to each transmitter and a feedback is transmitted to the corresponding transmitter so that maximum signal strength is achieved. The transmitters keeps on transmitting the signal with that optimum phase shift until the beamforming gain is above the minimum threshold gain. Once, the beamforming gain is reduced below the minimum threshold (i.e. N) then the receiver re-initialize the process of calculating the phase shift based on signal received from same transmitter or different transmitter. The receiver again determines the optimal phase shift for each of the transmitter and provide the feedback to the respective transmitters again. The process continues till the gain is reduced to minimum threshold according to the channel fading conditions.

In another embodiment, the transmitters may store the corresponding optimal phase shift received from the receiver in the memory (i.e. in a look-up table). Based on the knowledge about the signal received by the receiver corresponding to the transmitter and channel conditions, the transmitter can prepare a look-up table for storing the phase shift required in different scenarios. Accordingly, the transmitter can autonomously shift the phase based on a known channel condition and signal received at the receiver by the transmitter. In this way, the processing at the receiver end can be further reduced and transmitter can transmit the phase shifted signal in the beginning.

A description of an embodiment with several components in communication with each other does not imply that all such components are required. On the contrary, a variety of optional components are described to illustrate the wide variety of possible embodiments of the invention.

The illustrated method and apparatus of is set out to explain the exemplary embodiments shown, and it should be anticipated that ongoing technological development will change the manner in which particular limitations are arranged. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in performing analysis of various parameters such as gain, frequency, reflection coefficient etc. which are consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

Analysis of parameters can be performed by a Processing unit. Processing unit include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A method for facilitating at least one of wireless data communication and energy transfer using distributed beamforming in a wireless network, the method comprising:
    implementing a plurality of transmitter nodes communicatively coupled with a user device in the wireless network;
    receiving, by a receiver of the user device, a plurality of transmission signals corresponding to the plurality of transmitter nodes being in an orthogonal multiple access communication at the control data transmission stage;
    selecting, by a processor of the user device, one of the transmission signal, amongst the plurality of transmission signals, as a reference transmission signal for computing a phase-shift for the remaining transmission signals of the plurality of transmission signals, wherein the phase shift and signal strength for each of the remaining transmission signals is determined by:
        applying one or more predetermined phase-shift values upon each of the remaining transmission signals;
        determining a beamforming gain for each of the remaining transmission signals with respect to the reference signal based on the applied one or more predetermined phase shift values, wherein the beamforming gain indicates the signal strength of each of the corresponding signal after being beamformed at one or more time instances corresponding to the one or more predetermined phase-shift values when applied;
        selecting at least one predetermined phase-shift value corresponding to each transmitter node, amongst the one or more predetermined phase-shift values, having a maximum beamforming gain, thereby indicating the optimum phase shift for that transmitter; and
    facilitating, by the processor of the user device, at least one of the wireless data communication and energy transfer from the plurality of transmitter nodes with the receiver of the user device by enabling each of the plurality of transmitter nodes to transmit data or energy simultaneously, at the predetermined phase-shift computed by the receiver and fed back to the transmitter, thereby achieving the beamforming gain.

2. The method as claimed in claim 1, wherein the maximum beamforming gain is $N^2$, where N is the number of transmitters nodes.

3. The method as claimed in claim 1, further comprising:
    selecting the predetermined phase shift values based on the channel phase distribution, wherein the phase distribution is Nakagami-m phase distribution.

4. The method as claimed in claim 1, further comprising:
    selecting the predetermined phase shift value from a group of finite values, the group comprising at least one of $\pi/4$, $3\pi/4$, $5\pi/4$ and $7\pi/4$.

5. The method as claimed in claim 1, further comprising:
    selecting the signal received from the first transmitter node as reference signal if orthogonal multiple access is time division multiple access (TDMA).

6. The method as claimed in claim 1, further comprising:
    sending a feedback dynamically to the plurality of transmitter nodes and selecting, one of the transmission signals amongst the plurality of transmission signals, as a reference transmission signal again if the beamforming gain is below a minimum threshold point.

7. The method as claimed in claim 6, wherein the minimum threshold point is the point where the beamforming gain is less than N.

8. An apparatus for facilitating at least one of wireless data communication and energy transfer using distributed beamforming, the apparatus comprising:
    a plurality of transmitter nodes communicatively coupled with a user device in a wireless network;
    a receiver configured to receive a plurality of transmission signals corresponding to the plurality of transmitter nodes being in an orthogonal multiple access communication at the control data transmission stage;
    a processor is configured to:
        select one of the transmission signal amongst the plurality of transmission signals, as a reference transmission signal for computing a phase-shift for the remaining transmission signals of the plurality of transmission signals, wherein for determining the phase shift and signal strength for each of the remaining transmission signals, the processor is configured to:

apply one or more predetermined phase-shift values upon each of the remaining transmission signals;

determine a beamforming gain for each of the remaining transmission signals with respect to the reference signal based on the applied predetermined phase shift values, wherein the beamforming gain indicates the signal strength of each of the corresponding beamformed signal at one or more time instances corresponding to the one or more predetermined phase-shift values when applied;

select at least one predetermined phase-shift value corresponding to each transmitter node, amongst the one or more predetermined phase-shift values, having a maximum beamforming gain, thereby indicating the optimum phase shift for that transmitter; and facilitate at least one of the wireless data communication and energy transfer from the plurality of transmitter nodes with the receiver of the user device by enabling each of the plurality of transmitter nodes to transmit data or energy simultaneously, at the predetermined phase-shift computed by the receiver and fed back to the transmitter, thereby achieving the beamforming gain.

9. The apparatus as claimed in claim 8, wherein the maximum beamforming gain is $N^2$, where N is the number of transmitters nodes.

10. The apparatus as claimed in claim 8, wherein the processor is configured to select the predetermined phase shift values based on the channel phase distribution, wherein the phase distribution is Nakagami-m phase distribution.

11. The apparatus as claimed in claim 8, wherein the processor is configured to:
select the predetermined phase shift value from a group of finite values, the group comprising at least one of $3\pi/4$, $5\pi/4$ and $7\pi/4$.

12. The apparatus as claimed in claim 8, wherein the processor is further configured to:
select the signal received from the first transmitter node as reference signal if orthogonal multiple access is time division multiple access (TDMA).

13. The apparatus as claimed in claim 8, wherein the processor is further configured to:
Dynamically send a feedback to the plurality of transmitter nodes and select one of the transmission signals amongst the plurality of transmission signals, as a reference transmission signal again if the beamforming gain is below a minimum threshold point.

14. The apparatus as claimed in claim 11, wherein the minimum threshold point is the point where the beamforming gain is less than N.

* * * * *